United States Patent [19]

Rouch

[11] Patent Number: 4,987,604

[45] Date of Patent: Jan. 22, 1991

[54] SECOND OPINION METHOD OF PATTERN RECOGNITION ERROR REDUCTION

[75] Inventor: Stephen F. Rouch, Royal Center, Ind.

[73] Assignee: Delco Electronics Corporation, Kokomo, Ind.

[21] Appl. No.: 360,680

[22] Filed: Jun. 2, 1989

[51] Int. Cl.⁵ .............................................. G06K 9/68
[52] U.S. Cl. ........................................ 382/8; 382/30; 382/37
[58] Field of Search ................. 382/8, 62, 37, 38, 30, 382/34

[56] References Cited

U.S. PATENT DOCUMENTS

| | | | |
|---|---|---|---|
| 3,651,495 | 2/1972 | Kiji | 340/146.3 R |
| 3,715,724 | 2/1973 | Demonte et al. | 340/146.3 AG |
| 4,385,322 | 5/1983 | Hubach et al. | 358/221 |
| 4,491,962 | 1/1985 | Sakou et al. | 382/50 |
| 4,547,800 | 10/1985 | Masaki | 358/107 |

Primary Examiner—Leo H. Boudreau
Assistant Examiner—Andrew W. Johns
Attorney, Agent, or Firm—Albert F. Duke

[57] ABSTRACT

A method of operating optical pattern recognition apparatus which relies upon second opinions in which stored offset coordinates match one another within a predetermined tolerance to avoid unnecessarily high numbers of rejects, undesirable levels of risk in terms of pattern misalignments, or excessive cycle times in terms of unnecessary looping through different grey level thresholds.

7 Claims, 3 Drawing Sheets

SECOND OPINION METHOD OF PATTERN RECOGNITION ERROR REDUCTION

FIELD OF THE INVENTION

This invention relates generally to the field of optical pattern recognition and more specifically to methods of operating optical pattern recognition apparatus to reduce either errors or failures to locate the desired patterns or both.

BACKGROUND OF THE INVENTION

Pattern recognition apparatus is widely used in modern manufacturing processes to position work items with precision. In the manufacture of hybrid integrated circuits, for example, such equipment is frequently incorporated in automatic wire bonding machines. Components must be positioned with acceptable precision before bonding takes place lest connections be mislocated and products result which either require repair or must be discarded. If too many products have to be repaired or discarded because of faulty wire bonding, a great many of the advantages of an automated manufacturing operation are lost.

U.S. Pat. No. 4,385,322 (R. A. Hubach et al.), issued May 24, 1983, discloses pattern recognition apparatus including a television camera for creating an image of a work item and a processor for converting the image of the work item to digital form. The processor uses a selected threshold to determine which grey level is to be digitized as black instead of white. The picture elements (referred to in the art as pixels) of the digitized image are compared with those of a digitized reference image of the work item stored in memory. The pattern recognition apparatus then not only generates offset coordinates giving the apparent location of the work item image with reference to a base location, but also generates a quality number representing the extent of the match between the pixels of the digitized work item image and those of the digitized reference image. If the quality number is at least as large as a predetermined quality reference level, the offset coordinates are accepted as correct and used to control a servo mechanism which positions the work item. A frequently encountered problem in practice is that, because of such factors as changes in ambient lighting, differences in the reflectivity of individual work items, or even degradation in camera sensitivity, the selected grey level threshold does not always yield the desired results. It is desirable, therefore, that something be done to avoid an unnecessarily high percentage of rejects.

In the past, this problem has been attacked in the operation of pattern recognition apparatus by going a step beyond simply generating a quality number once and comparing it with the predetermined reference level. If this first quality number was less than the reference level, the attempt failed and the offset coordinates generated with it could not be used. The equipment was then made to begin cycling step by step through a number of different grey level thresholds, generating new offset coordinates and new quality numbers until either a quality number was found which at least reached the reference level or the cycle was completed without success. If a new quality number was found which equaled or exceeded the reference level, the offset coordinates associated with it were accepted and used to position the work item. If no new quality number equaled or surpassed the reference level, the pattern was considered not found (a "no find") and the work item discarded. The no find decisions could be reduced by lowering the quality reference level, of course, but only at the cost of en increased likelihood of error.

It is desirable to improve the efficiency of such pattern recognition and increase the useful product yield as much as possible with little or no throughput time loss and with little or no increase in the likelihood of error.

SUMMARY OF THE INVENTION

This invention achieves an improvement in product yield and saves overall cycle time without sacrifice in quality by finding acceptable work item position matches that might otherwise be missed. In accordance with an important aspect of the invention, a second opinion technique is used whenever a quality number equaling or exceeding the predetermined quality reference level is not found conventionally. Broadly, when any two or more attempts to find a quality number at least as great as the predetermined reference level fail, the two highest quality numbers are compared with a lower quality reference level and, if the comparison is successful (in the sense that both equal or surpass the lower quality reference level), their offset coordinates are tested to see if they match one another within a predetermined tolerance. If the offset coordinate match is within tolerance, one set is accepted and used to position the work item.

Somewhat more specifically, in accordance with this aspect of the invention, a second quality reference level lower than the first is selected at the outset. The apparatus is made to generate at least one additional quality number and set of offset coordinates on the basis of a corresponding different grey level threshold, accepting the new coordinates if a new quality number equals or exceeds the first reference level but retaining the two highest quality numbers generated and their corresponding offset coordinates in memory if it does not. The two stored quality numbers are compared with the second reference level and, if both equal or exceed it, the needed second opinion is obtained by comparing the stored sets of offset coordinates with one another. If the stored offset coordinates match one another within a predetermined tolerance, one set is accepted and used to position the work item. Product yield is improved by saving acceptable work items that might otherwise have been discarded or thought to require repair and time is saved by avoiding having to cycle through an excessive number of grey level thresholds.

In accordance with another aspect of the invention, a still greater improvement in product yield without sacrifice in quality may be obtained by adding a further sequence of steps to the portion of the second opinion process just described. To obtain such an improvement, a third quality reference level, even lower than the second, is selected when no set of offset coordinates has been found acceptable by the initial second opinion process. The stored quality numbers, at least one of which fails to reach the second reference level, are compared with the third quality reference level. If the stored quality numbers equal or exceed this third reference level, this supplemental second opinion is checked by comparing the stored sets of offset coordinates with one another. Once again, if the stored offset coordinates match one another within a predetermined tolerance, one set is accepted and used to position the work item. The third quality reference level is needed only a small percentage of the time and, although by itself it represents more risk than do the two higher reference levels, the risk is made acceptable by the requirement that the two sets of offset coordinates match one another within the designated tolerance. Product yield is improved still further and, because the additional sequence is needed in only quite a small number of situations, a considerable amount of time is saved in the aggregate.

The invention may be better understood from the following more detailed description of a specific example, taken in the light of the accompanying drawing and the appended claims.

DETAILED DESCRIPTION

Figure 1:
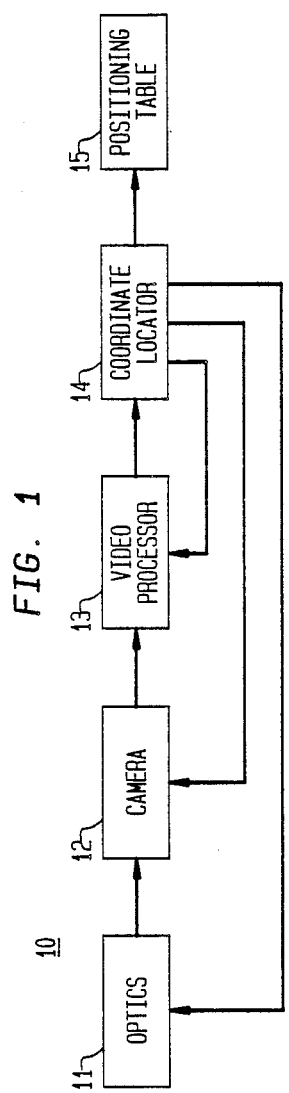
FIG. 1 is a block diagram of an illustrative digitized pattern recognition machinery of the type to which methods using the present invention are applicable.

A digitized pattern recognition apparatus 10 is shown in block diagram form in FIG. 1. Apparatus 10 is disclosed in considerably more detail in previously mentioned U.S. Pat. No. 4,385,322 and includes optics 11, a television camera 12, a video processor 13, a coordinate locator 14, and a programmable positioning table 15. By way of example, these components function together as part of an automatic wire bonding machine (not shown) to position a work item (not shown, e.g., a power transistor on a printed circuit board) so that wire bonding connections can be made with the needed degree of precision. Specifically, optics 11 focus on the work item and camera 12 creates an image of the work item which is converted to digital form by processor 13. Coordinate locator 14 compares the pixels of the digitized image from processor 13 with those of a digitized image stored in memory (either within coordinate locater 14 or elsewhere within apparatus 10). It then generates both a set of x,y offset coordinates representing the apparent position of the work item relative to the base location of the image stored in memory and a quality number Q representing the extent of the match between the pixels of the digitized work item image and those of the reference image. The Q number is compared with a reference level to determine whether or not the work item has been successfully located.

The interactive nature of the various components of pattern recognition apparatus 10 is indicated by arrows from coordinate locator 14 back to optics 11, camera 12, and video processor 13. In the context of an automatic wire bonding process for components (e.g., power transistors) to a printed circuit board these sections of the apparatus function to find the work item, a situation recognized when a Q number equal to or exceeding the chosen quality reference level is obtained. They then use the corresponding x,y offset coordinates generated by coordinate locator 14 to control positioning table 15 in a manner permitting successful wire bonding of the work item to take place.

Video processor 13 operates by storing in memory either a "1" or a "0" for each pixel in the video image, depending upon whether the pixel is observed as black or as white. A grey level threshold T determines what color to store when various levels of grey are present. Levels of grey above T are digitized as black, while those at or below are digitized as white. For purposes of illustration, it is assumed that possible threshold levels range from 0 to 255.

Coordinate locator 14, which may be and in practice generally is computer controlled, generates Q numbers. Which may, for purposes of illustration, range from 0 to 3000. A Q number of 0 is defined as the lowest possible level of match between the digitized work item image and the stored reference image, a non match, while a Q number of 3000 is defined as the highest possible level of match, an essentially perfect match. In practice, a Q number of 1500, which is in the middle of the range, is normally considered sufficient for assurance that the work item has been found. A lower Q number is interpreted as a no find situation and wire bonding is precluded. Work items not found in this manner typically either need repairing at additional expense or are scrapped.

In previously known methods of operating the pattern recognition apparatus 10 shown in FIG. 1, the quality number Q1 generated during a search for a find at a specific threshold T1 is first compared with a selected quality reference level L1, 1500 for example. If Q1 is greater than 1500, the system concludes that it has correctly identified the work item being observed and uses the stored x,y offset coordinates X1,Y1 of that find. If the lighting is ideal, the center of the grey level threshold range is usually the best place to choose the threshold. If variation in reflectivity of the product is not a factor, a single threshold might be sufficient. Since variation is encountered more often than not, however, looping routines have been created so that, if necessary, an entire range of thresholds is attempted on a step by step basis. If the first search routine, based for example upon a grey level threshold of T1 equal to 120, fails to produce a find, a new search is begun using a different threshold. A second grey level threshold T2, equal by way of example to 40, is used and a new quality number Q2 and offset coordinates X2,Y2 are generated. If the second search still fails to produce Q2 greater than 1500, the grey level threshold is incremented by 20 to 60 and another attempt is made. The process continues by raising the grey level threshold by increments of 20 until a threshold of 240 is reached. At this point, if a successful find has not been achieved, the work item is considered not found. This means that the wire bonder cannot bond it and that the work item has to be discarded or set aside for repair.

Selection of the best quality reference level L1 in this known routine is one of several significant problems. Setting the reference level excessively high creates too many unnecessary no finds. Setting it too low permits the pattern matching system to be convinced that it has located a work item when in reality the x,y offset coordinates it has produced are inaccurate. As has been mentioned, this type of error creates either scrap or reliability problems due to mislocated wire bonds. It is necessary, therefore, to guard against the latter condition at the expense of creating excessive no finds. Another problem associated with the known routine is that it significantly increases the cycle time needed to find individual work items, as it often requires looping through many grey level thresholds before a work item can be considered found. Particularly in manufacturing processes where as many as three different cameras are sometimes used to control the final positioning of a work item, total cycle time can be increased for individual work items by as much as thirty percent. Because a wire bonding operation of this type is likely to be a potential production bottleneck, that much of an increase in cycle time tends to be undesirable.

Figures 2, 3:
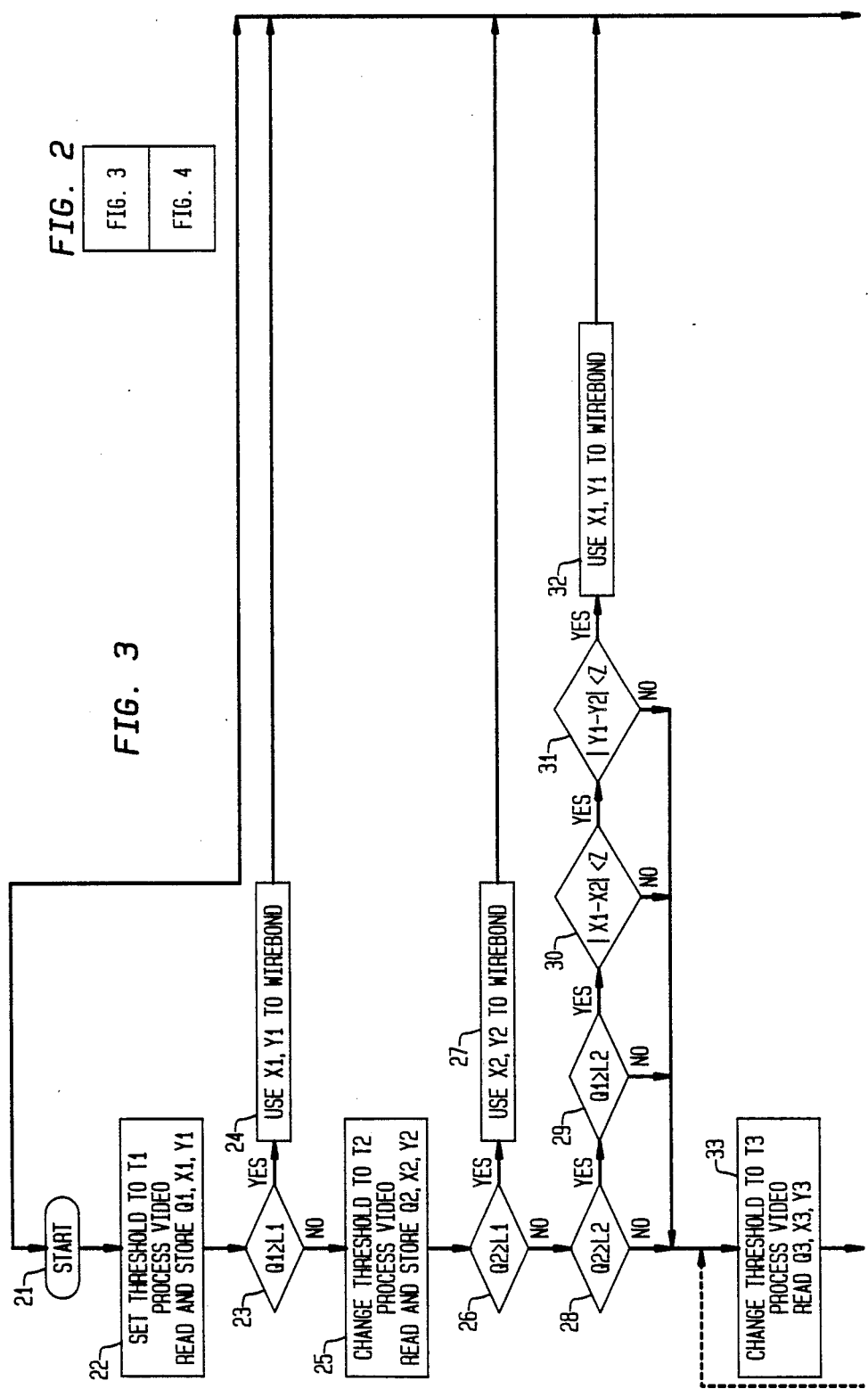
FIG. 2 shows the manner in which the remaining figures fit together to form a flow chart of a method of operating such apparatus in accordance with the present invention.
FIGS. 3 and 4, when put together in the manner shown in FIG. 2, constitute such a flow chart.
Figure 4:
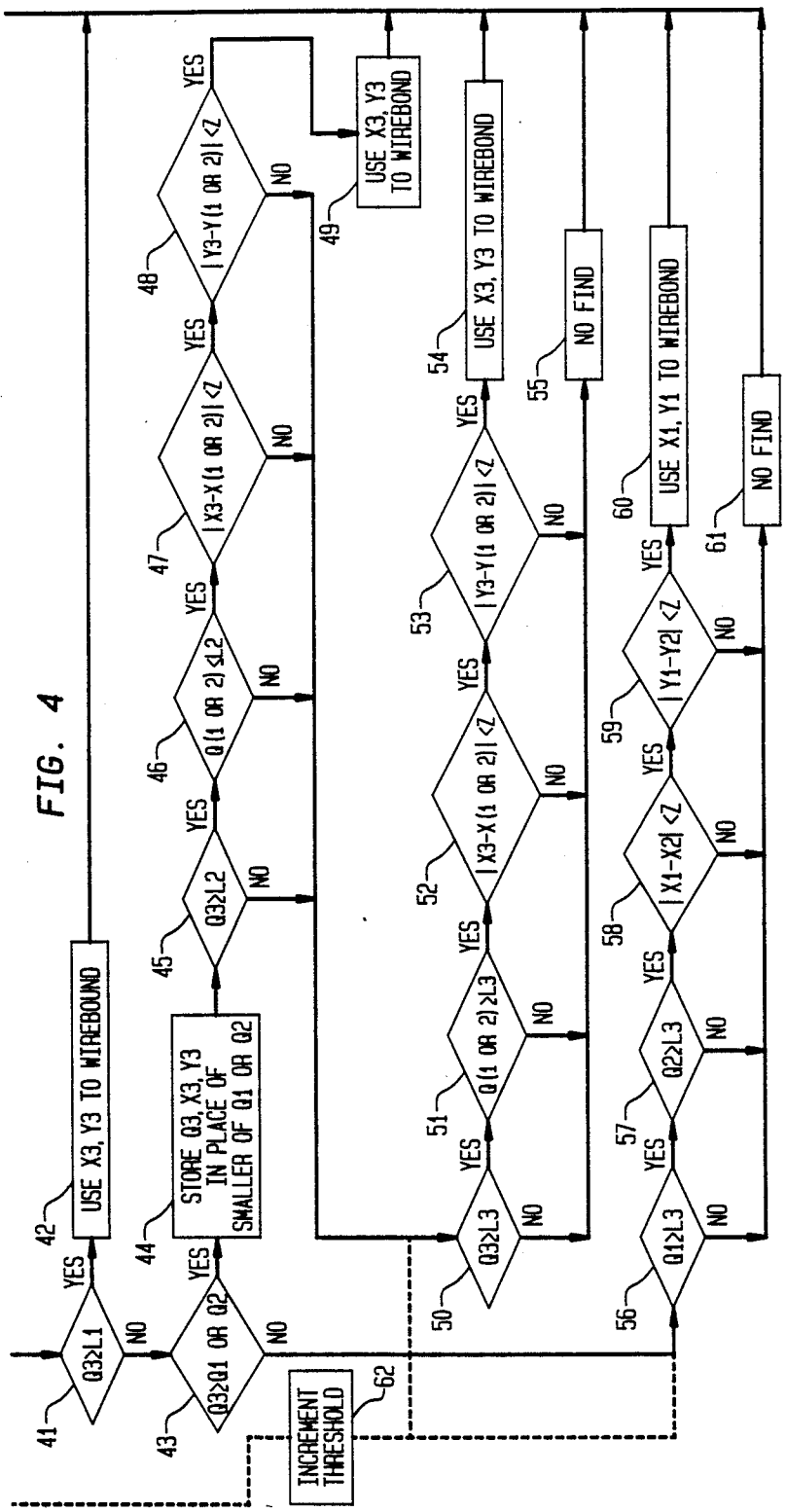

FIG. 2 illustrates how the remaining figures of the drawing fit together to form a flow chart of a specific method of operating the apparatus of FIG. 1 in accordance with the present invention. FIGS. 3 and 4 are aligned with the long dimension of each in a horizontal position, with FIG. 3 directly above FIG. 4. As before, the method or process is described by way of example in the context of an automatic wire bonding operation for bonding a power transistor to a printed circuit board.

The specific example illustrated in FIGS. 3 and 4 of a method making use of various aspects of the present invention includes a sequence of steps 21 through 33 in FIG. 3 and another sequence of steps 41 through 62 in FIG. 4. All steps combine to form a single illustrative process. In the description which ensues, specific steps are generally not identified with individual portions of pattern recognition apparatus 10 in order to avoid unnecessary distraction. It will be evident, however, that most are performed either in whole or in part within coordinate locator 14. It will be equally self evident whenever some require the cooperation of other portions of pattern recognition apparatus 10 as well.

The process of the present invention may best be thought as beginning at the upper left hand corner of FIG. 3 with a step 21 bearing, for convenience, the label "start." A work item in the form of a semiconductor integrated circuit is being located so that it can be positioned by positioning table 15 in FIG. 1 for wire bonding. In the next step 22, the grey level threshold is set to a first value T1, the video image is processed, and Q1 and X1,Y1 are read and stored in memory. Q1 and X1,Y1 are the initial quality number and set of offset coordinates, respectively. Subsequent step 23 is a comparison between Q1 and a first or primary selected quality reference level L1. By way of example, threshold level T1 is 120 and quality reference level L1 is 1500. If Q1 is equal to or greater than L1, the comparison is successful in that a "yes" answer results and the process moves to a step 24. With step 24, the process terminates by using the offset coordinates X1,Y1 to position the work item for wire bonding. If Q1 fails to reach L1, a "no" answer is produced and the process moves to a step 25, in which the grey level threshold is shifted to a new value T2 as has been done in the past. Threshold T2 is, for example, 40. The video image is processed once more and the apparatus reads and stores Q2 and X2,Y2. In a step 26, Q2 is compared with reference level L1. If Q2 equals or exceeds reference level L1, the process moves to a step 27, where it terminates by using offset coordinates X2,Y2 to position the work item for wire bonding. The entire process until now is quite safe in a reliability sense because of the relatively high primary quality reference level used.

Up until this point, the method of operation illustrated by the flow chart is similar to many frequently used in the past. Instead of continuing to cycle step by step through an entire range of grey level thresholds until a quality number equal to or greater than the selected quality reference level L1 is found, the invention makes use of a second opinion procedure which serves as a important short-cut which saves manufacturing time. This procedure is invoked in the event that quality number Q2 fails to reach the initial reference level L1 in step 26 and begins with a step 28 in which Q2 is compared with a secondary lower quality reference level L2. L2 is set, by way of example, at 1200. L2 would be less safe than L1 if used by itself as the primary quality reference level. In this context, however, it is made safe in accordance with one aspect of the invention by using the data already available as the basis for the second opinion.

The second opinion featured by the present invention is obtained in several steps. If Q2 is found to be equal to or in excess of L2, a step 30 is invoked in which Q1 is compared with L2. If Q1 and Q2 are both equal to or in excess of L2, a step 30 compares the stored x offset coordinates X1 and X2 with one another. If the absolute value of their difference is within a predetermined tolerance Z, the stored y offset coordinates Y1 and Y2 are compared with one another in a further step 31. Tolerance Z is, for example, 0.002 inch. If the absolute value of the difference between the stored y offset coordinates is within tolerance Z, the integrated circuit is considered found and the coordinate set X1,Y1 is accepted as accurate and used for positioning the work item for wire bonding and the process is terminated. Coordinate set X2,Y2 may, of course, be used instead as there is no significant difference between the two sets. In this manner, the invention permits a lower and somewhat less safe quality reference level L2 to be used without significant risk because the two sets of offset coordinates agree with one another within the selected tolerance.

The second opinion process featured by the invention realizes a significant improvement over previous operating methods at this point because of fewer unnecessarily rejected work items and a considerable shortening of the overall process cycle. It may, therefore, be terminated here if it is desired to keep the process as simple as possible. Even greater improvements may, however, be obtained by continuing through one or more additional stages. Although the additional stages do add somewhat to cycle time, their aggregate effect upon overall cycle time is typically insignificant because they are needed so seldom.

The vast majority of work items are located and wire bonded accurately in the beginning stages of the process. Should any of the comparisons of steps 28, 29, 30, and 31 fail by producing a "no" answer, the process moves on to a step 33, where the grey level threshold level is changed to a third value T3, 60 for example. The video image is also processed once more and a new quality number Q3 is read into memory along with its corresponding set of offset coordinates X3,Y3. The process now moves to a step 41 (shown in the upper left hand corner of FIG. 4) where Q3 is first compared with primary quality reference level L1. If Q3 is equal to or greater than L1, the integrated circuit is considered found and the process terminated by using its corresponding offset coordinates X3,Y3 in a step 42 to position the work item and wire bond.

In the event that quality number Q3 fails to reach L1 in step 41 and a "no" answer results, the process moves to a step 43 where Q3 is compared with Q1 and Q2, both of which have been stored in memory. If Q3 is equal to or larger than either, the process moves to a step 44 and Q3 and its set of offset coordinates X3,Y3 replace in memory the lower of Q1 and Q2 and its offset coordinates X1,Y1 or X2,Y2. The next step 45 then compares Q3 with secondary quality reference level L2. If Q3 is equal to or greater than L2, the process moves to a step 46, where the other stored quality number Q1 or Q2 is compared with L2. If step 46 is successful and produces a "yes" answer, a step 47 compares the absolute value of the difference between X3 and the other stored coordinate X1 or X2 to see if there is a match within tolerance Z. If there is such a match, a step 48 performs a similar comparison of Y3 end the other stored coordinate Y1 or Y2. If step 48 succeeds by producing a "yes" answer, the process terminates in a step 49 and uses coordinate set X3,Y3 to position the work item and wire bond. In the manner explained previously, the other set of stored offset coordinates may be used instead as there are no significant differences between the two.

Should any of comparison steps 45, 46, 47, or 48 fail by producing a "no" answer, the process moves to a step 50 (shown near the left hand side of FIG. 4) where a still lower quality reference level L3 is used and another second opinion sought. Step 50 compares quality number Q3 with this lower reference level L3. By way of example, L3 is 800 and, if it were to be used alone, would represent a much greater risk. If comparison step 50 is successful and a "yes" answer results, a further step 51 compares Q1 or Q2, whichever was stored in step 44, with L3. If step 51 succeeds, another of the second opinions featured by the invention is obtained by using additional steps 52 and 53 to determine whether or not the corresponding sets of offset coordinates match one another within tolerance Z. If those offset coordinates are within that tolerance, the process is terminated in a step 54 and coordinates X3,Y3 are used to position the work item and wire bond. The riskier reference level L3 has been justified because of the coordinate match. Should any of comparison steps 50, 51, 52, and 53 fail by producing "no" answers, a no find step 55 is finally invoked and the work item rejected.

The stage of the process which has just been described began with step 43 (shown near the upper left hand corner of FIG. 4) and depended upon a finding that Q3 equaled or exceeded either Q1 or Q2. In the event that Q3 fails comparison step 43 and a "no" answer results, the process moves directly to a step 56 in the lower left hand corner of FIG. 4 in which Q1 is compared with L3. If Q1 is equal to or greater than L3, a similar comparison of Q2 with L3 takes place in a step 57. If that comparison succeeds, producing a "yes" answer, a step 58 compares the absolute value of the difference between X1 and X2 (which remain stored in memory because of the failure of step 43) with tolerance Z. After successful completion of step 58, a step 59 compares the absolute value of the difference between Y1 and Y2 with tolerance Z. If that final comparison succeeds, the process is terminated by a step 60, using offset coordinates X1,Y1 (or, alternatively, X2,Y2) to position the work item and wire bond. Should any of comparison steps 56, 57, 58, or 59 fail, a step 61 terminates the process with a no find and the work item is rejected.

A final process step 62 (shown at the left hand side of FIG. 4 with dotted line connections to the remainder of the process) may be used in accordance with yet another aspect of the invention to cycle through additional grey level thresholds in that small minority of instances when the third or most risky quality reference level is used.

Only three gray level thresholds T1, T2 and T3 have been used in the example so far. Step 62 allows for any number of thresholds, for example 0–255, to be used starting with step 33. Keep in mind that for every threshold Tn and corresponding Qn and offset coordinates Xn and Yn, a comparison with L1 is first tried. If this is successful, coordinates Xn and Yn are used to process the work item. If Qn is less than L1 then a comparison of Qn with the two best quality numbers in memory is performed and the two highest of the three are retained in memory. These two quality numbers are compared with L2. If both quality numbers are greater than L2 and the corresponding x,y offset coordinates are the same within a specified tolerance Z, then one of the sets of x,y offset coordinates is accepted and the work item is processed. If not then the threshold is incremented (step 62) and the process starts again at step 33.

After an entire range of thresholds has been tried and comparisons with limits L1 and L2 have been unsuccessful, substantially lower and somewhat riskier limit L3 is used as a final attempt to process the work item successfully. Since most work items are "found" using either L1 or L2, the number of work items processed with quality numbers exceeding only the substantially lower limit L3 is very low. Due to the second opinion process, the probability of error within the small group of work items using L3 is also very low. The combination of these two low probabilities produces an acceptable degree of certainty, permitting use of the substantially lower limit L3. It is not necessary to use L3 until all other attempts to generate acceptable x,y coordinates from limits L1 and L2 have been exhausted. The use of L3 is an important step, however, in taking no find decisions down to the 0.01 to 0.05 percent range without significant increase in the probability of error. Though the use of L3 takes up the most overall cycle time, it is needed only rarely and thus has little overall cycle time impact.

What the method of the present invention does is make single grey level threshold finds very safe in terms of the probability of inaccurate find data. When a second lower and less safe quality reference level is used, a concurring second opinion in terms of offset coordinate tolerances is sought. In the absence of a concurring second opinion, after using three thresholds T1, T2 and T3, a larger and more complete set of grey level thresholds may be cycled through (in steps of 20, for example) and the best two quality numbers obtained compared with the first and second reference levels. Only after all desired threshold levels have been tried and the associated Q, X and Y data have been compared to L1 and L2, and a "no find" situation still exists, is the third and most risky reference level L3 used in conjunction with the two best quality numbers in memory. Only if the corresponding x,y offset coordinates provide a sufficiently close match is this third level opinion accepted. Thus, a process practicing one or more aspects of the invention works very quickly in the great majority of instances, going into extended find routines only for difficult to find work items.

It is of interest to note that in the manufacture of hybrid integrated circuits when the full process just described fails to find a work item, nearly two thirds of the no finds are typically found by simply rerunning the process one more time before giving up. Such an extra cycle has been found to be needed only rarely, however, and overall cycle time is substantially unaffected. In this application, the final no find rate has been found to be in only the 0.01 to 0.05 percent range.

It is to be understood that the methods which have been described are illustrative. Modifications may readily be devised by those skilled in the art without departing from the spirit and scope of the invention. For example, a wide variety of different types of work items can be located for bonding or other operations.

The embodiments of the invention in which an exclusive property or privilege is claimed are defined as follows:

1. A method of operating a pattern recognition system which digitizes the image of a work item, using a selected threshold to determine a grey level to be digitized as black instead of white, compares the pixels of the digitized work item image with those of a digitized reference image stored in memory, and produces both the offset coordinates of the work item image relative to the reference image and a quality number representing the match between the pixels of the digitized work item image and those of the digitized reference image, said method comprising the steps of:

seeking a quality number on the basis of one grey level threshold;

accepting the offset coordinates associated with said quality number if said quality number exceeds a first quality reference level;

otherwise seeking another quality number on the basis of another grey level threshold;

accepting the offset coordinates associated with said other quality number if said other quality number equals or exceeds said first quality reference level;

otherwise comparing both of said quality numbers with a second lower quality reference level; and accepting the offset coordinates of one of said quality numbers if the offset coordinates of both quality numbers match one another within a predetermined tolerance.

2. A method of operating a pattern recognition system which digitizes the image of a work item, using a predetermined threshold to determine a grey level to be digitized as black instead of white, compares the pixels of the digitized work item image with those of a digitized reference image stored in memory, and produces both the offset coordinates of the work item image and a quality number representing the match between the pixels of the digitized work item image relative to the reference image and those of the digitized reference image, said method comprising the steps of:

selecting a first quality reference level and at least one lower quality reference level;

generating a first quality number and corresponding offset coordinates;

comparing said first quality number with said first reference level;

accepting associated offset coordinates if said first quality number equals or exceeds said first reference level;

generating at least one additional quality number and corresponding offset coordinates on the basis of a corresponding different grey level threshold if said first quality number does not equal or exceed said first reference level;

accepting its associated offset coordinates if said additional quality number equals or exceeds said first reference level;

otherwise storing the two highest quality numbers otherwise generated and their corresponding offset coordinates in memory;

comparing the stored quality numbers with said lower reference level;

comparing the stored sets of offset coordinates with one another if both of said stored quality numbers equal or exceed said lower reference level; and accepting the offset coordinates of one of the stored quality numbers if those associated with both stored quality numbers match one another within a predetermined tolerance.

3. A method of operating a pattern recognition system which digitizes the image of a work item, using a predetermined threshold to determine a grey level to be digitized as black instead of white, compares the pixels of the digitized work item image with those of a digitized reference image stored in memory, and produces both the offset coordinates of the work item image relative to the reference image and a quality number representing the match between the pixels of the digitized work item image and those of the digitized reference image, said method comprising the steps of:

selecting a first quality reference level and second and third successively lower quality reference levels;

generating a first quality number and corresponding offset coordinates;

comparing said first quality number with said first reference level;

accepting its associated offset coordinates if said first quality number equals or exceeds said first reference level;

generating at least one additional quality number and corresponding offset coordinates on the basis of a different grey level threshold if said first quality number does not equal or exceed said first reference level:

accepting its associated offset coordinates if said additional quality number equals or exceeds said first reference level;

otherwise storing the two highest quality numbers generated and their corresponding offset coordinates in memory:

comparing the stored quality numbers with said second reference level;

comparing the stored sets of offset coordinates with one another if both of said stored quality numbers equal or exceed said second reference level;

accepting the offset coordinates associated with one of the stored quality numbers if those of both stored quality numbers match one another within a predetermined tolerance;

comparing the stored quality numbers with said third reference level if at least one is less than said second reference level;

comparing the stored sets of offset coordinates with one another if both of said stored quality numbers equal or exceed said third reference level; and accepting the offset coordinates associated with one of the stored quality numbers if those of both stored quality numbers match one another within a predetermined tolerance.

4. A method of locating the position of a work item comprising the steps of:

forming a digitized image of the work item, using a first threshold T1 to determine a grey level to be digitized black instead of white;

comparing the image of the work item with a stored reference image;

generating both a first quality number Q1 representing the match between the image of the work item and the reference image and a first set of corresponding location coordinates (X1,Y1) for the work item;

comparing Q1 with a first predetermined quality reference level L1;

accepting (X1,Y1) as correct if Q1 is equal to or greater than L1;

otherwise forming a second digitized image of the work item using a second grey level threshold T2;

comparing said second image with said stored reference image;

generating both a second quality number Q2 representing the match between the second image of the work item and said reference image and a second set of location coordinates (X2,Y2) for the work item;

accepting (X2,Y2) as correct if Q2 is equal to or greater than L1;

otherwise comparing both Q1 and Q2 with a second lower quality reference level L2;

comparing (X1,Y1) and (X2,Y2) with one another if both Q1 and Q2 are equal to or greater than L2; and accepting either (X1,Y1) or (X2,Y2) as correct if both match one another within a predetermined tolerance.

5. A method of locating the position of a work item comprising the steps of:

forming a digitized image of the work item, using a first threshold T1 to determine a grey level to be digitized as black instead of white;

comparing the image of the work item with a stored reference image;

generating both a first quality number Q1 representing the match between the image of the work item and the reference image and a set of corresponding location coordinates (X1,Y1) for the work item;

storing both Q1 and (X1,Y1) in memory;

selecting a first quality reference level L1 and a second lower quality reference level L2;

comparing Q1 with L1;

accepting (X1,Y1) as correct if Q1 is equal to or greater than L1;

otherwise forming a second digitized image of the work item using a second grey level threshold T2;

comparing said second image with said stored reference image;

generating both a second quality number Q2 representing the match between the second image of the work item and said reference image and a second set of location coordinates (X2,Y2) for the work item;

storing both Q2 and (X2,Y2) in memory;

accepting (X2,Y2) as correct if Q2 is equal to or greater than L1;

otherwise comparing both Q1 and Q2 with L2;

comparing (X1,Y1) and (X2,Y2) with one another if both Q1 and Q2 are greater than L2; and accepting one of (X1,Y1) and (X2,Y2) as correct if said sets match one another within a predetermined tolerance.

6. A method of locating the position of a work item comprising the steps of:

forming a digitized image of the work item, using a first threshold T1 to determine a grey level to be digitized as black instead of white;

comparing the image of the work item with a stored reference image;

generating both a quality number Q1 representing the match between the image of the work item and the reference image and a set of corresponding location coordinates (X1,Y1) for the work item:

storing both Q1 and (X1,Y1) in memory;

selecting first, second, and third quality reference levels L1, L2, and L3, each successively lower than the other;

comparing Q1 with L1;

accepting (X1,Y1) as correct if Q1 is equal to or greater than L1;

otherwise forming a second digitized image of the work item using a second grey level threshold T2;

comparing said second image with said stored reference image;

generating both a second quality number Q2 representing the match between the second image of the work item and said reference image and a second set of location coordinates (X2,Y2) for the work item;

storing both Q2 and (X2,Y2) in memory;

accepting (X2,Y2) as correct if Q2 is equal to or greater than L1;

otherwise comparing both Q1 and Q2 with L2;

comparing (X1,Y1) and (X2,Y2) with one another if both Q1 and Q2 are equal to or greater than L2;

accepting either (X1,Y1) or (X2,Y2) as correct if both match one another within a predetermined tolerance;

otherwise comparing both of Q1 and Q2 with L3;

comparing (X1,Y1) and (X2,Y2) with one another if both Q1 and Q2 are greater than L3; and accepting either (X1,Y1) or (X2,Y2) as correct if both match one another within a predetermined tolerance.

7. The method of locating the position of a work item of claim 6 further comprising the steps of:

forming a third digitized image of the work item using a third grey level threshold T3;

comparing said third image with said stored reference image;

generating both a third quality number Q3 representing the match between the third image of the work item and said reference image and a third set of location coordinates (X3,Y3) for the work item;

substituting Q3 and (X3,Y3) in memory for the lesser of the two stored quality numbers and its associated set of location coordinates;

accepting (x3,Y3) as correct if Q3 is equal to or greater than L1;

comparing both of the quality numbers stored in memory with L2;

comparing the sets of location coordinates stored in memory with one another if both of said stored quality numbers are equal to or greater than L2;

accepting one of the stored sets of location coordinates as correct if said sets match one another within a predetermined tolerance:

otherwise comparing both of the quality numbers stored in memory with L3;

comparing the sets of location coordinates stored in memory with one another if both of said stored quality numbers are greater than L3; and accepting one of the sets of location coordinates stored in memory as correct if said sets match one another within a predetermined tolerance.

* * * * *